United States Patent [19]
Tal et al.

[11] Patent Number: 5,892,980
[45] Date of Patent: Apr. 6, 1999

[54] SYSTEM FOR DYNAMICALLY CHANGING THE LENGTH OF TRANSMIT AND RECEIVE SAMPLE BUFFERS UTILIZING PREVIOUS RESPONDING TO AN INTERRUPT IN A COMMUNICATIONS SYSTEM

[75] Inventors: Nir Tal, Haifa; Ron Cohen, Ramat Hasharon; Zeev Collin, Haifa, all of Israel

[73] Assignee: Comsys Communication and Signal Processing Ltd., Herzlia, Israel

[21] Appl. No.: 808,071

[22] Filed: Feb. 28, 1997

[51] Int. Cl.$^6$ .............................. G06F 13/14; G06F 13/20
[52] U.S. Cl. .......................... 395/876; 395/868; 395/872; 395/670; 395/675
[58] Field of Search .................................. 395/821, 872, 395/876, 868, 670, 675

[56] References Cited

U.S. PATENT DOCUMENTS

| | | | |
|---|---|---|---|
| 4,467,411 | 8/1984 | Fry et al. ................................. | 364/200 |
| 5,473,686 | 12/1995 | Virdee ..................................... | 379/410 |
| 5,530,744 | 6/1996 | Charalambous et al. ............... | 379/265 |
| 5,566,208 | 10/1996 | Balakrishnan .......................... | 375/240 |
| 5,613,129 | 3/1997 | Walsh ..................................... | 395/740 |
| 5,627,533 | 5/1997 | Clark ....................................... | 341/51 |
| 5,727,227 | 3/1998 | Schmidt et al. ....................... | 395/800 |

*Primary Examiner*—Thomas C. Lee
*Assistant Examiner*—Rehana Perveen
*Attorney, Agent, or Firm*—Darby & Darby

[57] ABSTRACT

An apparatus for and method of implementing a novel buffer based fall duplex communication system is disclosed. The disclosed invention is particularly useful in native signal processing systems wherein heavy contention of processor resources typically exist, such as in systems running multi-tasking operating systems. The communication system of the present invention includes a receiver, transmitter, CODEC and telephone hybrid. The major components of the system operate on a buffer of input samples consisting of a set of input bits. The communication system operates to generate a buffer of output samples consisting of a set of output bits. The invention utilizes a novel dynamic buffer size mechanism to optimize the tradeoff between buffer delay and processing time period, on one hand, and robustness to interrupt latency and processor availability on the other hand. Small buffers provide the communication system with short, accurate response times in addition to short processing times. Using a large buffer of spare or dummy samples to be transmitted while the CPU is unavailable reduces the probability of a buffer underrun, thus giving the operating system greater leeway in deciding the exact time the signal processing functions in the modem routine are run. In this manner latency time is held to a minimum and data is not lost or corrupted. The concept of using dummy bits or silence for the generation of spare samples enables the elimination of additional latency caused by the spare samples by overriding them if they are not transmitted. This is achieved without a loss of signal coherency.

8 Claims, 6 Drawing Sheets

SYSTEM FOR DYNAMICALLY CHANGING THE LENGTH OF TRANSMIT AND RECEIVE SAMPLE BUFFERS UTILIZING PREVIOUS RESPONDING TO AN INTERRUPT IN A COMMUNICATIONS SYSTEM

FIELD OF THE INVENTION

The present invention relates to communication systems and in particular to modems utilizing native signal processing.

BACKGROUND OF THE INVENTION

Traditional fall duplex communication systems are typically implemented using dedicated hardware. The typical modem includes a digital signal processor (DSP) integrated circuit (IC) at its core, a random access memory (RAM), digital to analog converter (D/A), analog to digital converter (A/D) and data access arrangement (DAA). The modem is typically coupled to a host computer bus through bus interface circuitry. The host computer central processing unit (CPU) generates the data to be transmitted through the modem and receives the data received by the modem.

DSP based modems such as the type described above generally operate by processing a relatively small number of samples from the input A/D converter and generating a similarly small number of samples to be output through the D/A converter. These systems are said to work on a 'sample by sample' basis or a 'symbol by symbol' basis, depending on the particular implementation. Such schemes have the benefit of minimal delay time, since the input is processed almost immediately. These schemes, however, require very high computing power which is typically provided by a dedicated DSP.

Although some modems can be very powerful, they are also relatively expensive due to the dedicated DSP hardware involved. Therefore, the recent trend in the personal computer industry is to implement modems by exploiting the built in general CPU without the need for additional processing hardware. This requires the modem to share CPU time with other tasks executed by the system on the same processing unit. In a typical computer CPU, sharing is managed by an operating system on a 'time slice' basis. During every slice a different task executes. Task execution can be preempted through interrupts caused by a periodic timer indicating the end of the current time slice, or by some other hardware device (e.g., an AID converter) indicating the occurrence of some event (e.g., the availability of a sample of data).

Although the interrupt mechanism is designed to switch the currently running task to a task that handles the interrupt in as little time as possible, in practice it may take a substantial amount of time before an interrupt is actually handled. The time delay may be caused by hardware delays, multiple sources of interrupts in the computer system or priority given to some interrupts over others. The time between the actual occurrence of the interrupt trigger and the beginning of execution of the interrupt handler routine is defined as 'interrupt latency.' A typical interrupt latency in the PC environment is in the range of 0 to 5 milliseconds. However, in the PC environment, there is no guarantee that a running program will give up control within a predefined amount of time. Well behaved programs can be expected not to dominate the CPU for an unreasonable time period, however some tasks may hold the CPU resource for a relatively long period of time.

Therefore a straight forward translation of a traditional DSP based modem to a native signal processing (NSP) environment is very problematic, since it requires the execution of the modem task for each sample (or symbol) and the completion of its execution before the next sample (symbol) arrives in order to meet the 'real time' operation requirement. In order to minimize the time between a sample (or symbol) arrival and the modem activation, a straight forward implementation would be to generate an interrupt upon the arrival of each sample (i.e., symbol). In such an implementation, the real time constraint may be too difficult to overcome and the modem routine may not be executed on time due to long interrupt latencies, which may result in data loss. This problem can be overcome by designing the modem routine to operate on a buffer of samples rather than on one sample only. A buffer of samples means a longer time period between consecutive calls to the modem routine. The real time requirement in this case is that the time to process an input buffer of samples and to generate an output buffer for transmission is smaller than the time it takes to receive/transmit a buffer of the same size.

The buffer operation scheme, however, poses new problems the severity of which is proportional to the buffer size currently in use. The use of buffers in processing modem data causes interference with other tasks running in parallel. Interactive processes are typically interrupt driven and execute as either an interrupt routine or a foreground task triggered by an interrupt. Such tasks may suffer noticeable delay due to long execution times of the modem routine which is also executed either as an interrupt routine or as a high priority task. For example, a modem routine execution time of only 10 ms will cause jerky movement of a mouse or other pointing device.

The buffer operation scheme also suffers from an inherent time delay disadvantage due to the sample, which is received early in time and placed at the beginning of the buffer, being processed only after an entire buffer is received. This time delay disadvantage interferes with some high rate data pumping modem standards such as ITU V.32 bis and V.34, which impose strict time constraints on sample processing times and the time to respond to certain signals from the modem at the other end of the connection. These signals are transmitted mainly during the beginning of the modem connection. Long processing latency is also a disadvantage in the event the transferred data required immediate response, such as in remote interactive applications.

SUMMARY OF THE INVENTION

The present invention has been developed to alleviate the problems discussed above in the implementation of an NSP based full duplex communication system. These problems include the necessity to be resistant to interrupt, operating system and other task related latencies, yet not dominate the CPU for long periods of time creating long latencies for other tasks.

The present invention addresses the problems discussed above by dynamically modifying the size of the buffer. The size of the buffer is permitted to vary within a predefined range. During its steady state, the communication system utilizes short buffers which provide short and accurate processing response time. However, when the CPU is unavailable to perform the modem routine (i.e., the CPU is busy with other tasks) the buffer size is dynamically increased by.the smallest amount possible so as to make the modem task resistant to operating system latencies and CPU load spikes. The buffer size is increased only when system performance dictates that an increase is required. Thus, there is a constant balancing of the response time and the processing time effective to optimize the load on the CPU.

It is another object of the present invention to provide a system that can vary the size of its sample buffers in accordance with the desired delay time period.

In addition, the dynamic buffer modification taught by the present invention does not incur any data loss. The change in buffer size occurs smoothly and coherently without the loss of any data. Coherency is hereby defined as not losing or throwing away any input or output samples.

The present invention discloses an apparatus for and a method of implementing a novel buffer based full duplex communication system. The disclosed invention is particularly useful in native signal processing systems wherein heavy contention of processor resources typically exists, such as in systems running multi-tasking operating systems. The communication system of the present invention includes a receiver, transmitter, CODEC and telephone hybrid. The major components of the system operate on a buffer of input samples consisting of a set of input bits. The communication system operates to generate a buffer of output samples consisting of a set of output bits. The invention utilizes a novel dynamic buffer size mechanism to optimize the tradeoff between buffer scheme delay and processing time period, on one hand, and robustness to interrupt latency and processor availability on the other hand. Small buffers provide the communication system with short, accurate response times in addition to short processing times. Using a large buffer of spare or dummy samples to be transmitted while the CPU is unavailable reduces the probability of a buffer underrun, thus giving the operating system greater leeway in deciding the exact time the signal processing functions in the modem routine are run. In this manner delay time is held to a minimum and data is not lost or corrupted. The concept of using silence or dummy bits for the generation of spare samples enables the elimination of additional delay caused by the spare samples by overriding them if they are not transmitted. This is achieved without a loss of signal coherency.

There is therefore provided in accordance with the present invention, in a communication system having a transmitter, a transmit sample buffer having a length L2, a receiver and a receive sample buffer having a length L2, the system executing on an interrupt basis within a computer every L1 sample times, a method for dynamically changing the length of the transmit and receive sample buffers, the method comprising the steps of determining the number of transmit samples, defined by L, transmitted since the previous occurrence of an interrupt, extracting L new samples from the receive buffer, exercising the receiver using the L new samples, and exercising the transmitter and generating L new samples.

There is also provided in accordance with the present invention, in a communication system having a transmitter, a transmit sample buffer having a length L2, a receiver and a receive sample buffer having a length L2, the system operated on an interrupt basis within a computer every L1 sample times, a method for dynamically changing the length of the sample buffers, the method comprising the steps of determining the number of transmit samples, defined by L, transmitted since the previous occurrence of an interrupt, extracting L new samples from the receive buffer, exercising the receiver using the L new samples, determining the number of transmit samples, defined by L3, transmitted from the previous occurrence of an interrupt until the end of the current processing associated with the current interrupt, exercising the transmitter to generate L new samples and dummy samples in accordance with L and L3, overwriting dummy samples previously stored in the transmit buffer that were not yet transmitted with the L new samples and the dummy samples, transmitting the L new samples, and transmitting the dummy samples in the event the next interrupt is delayed.

In addition, the method further comprises the step of maintaining at least one intermediate state of the transmitter between processing cycles. Also, the dummy samples generated during the step of exercising the transmitter correspond to silence.

Further, there is provided in accordance with the present invention a host computer based communication system for coupling the host computer to a communication line, the system executing on an interrupt basis within the host computer every L1 sample times, the system comprising a transmitter coupled to a data source for generating symbols therefrom to be transmitted, a transmit sample buffer having a length L2 for buffering data generated by the transmitter, digital to analog means for converting digital symbol data generated by the transmitter into analog form for transmission over the communication line, analog to digital means for converting analog symbol data received over the communication line into digital form, a receive sample buffer having a length L2 for buffering data generated by the analog to digital means, a receiver for generating digital data from digital symbol data received from the receiver, means for determining the number of transmit samples, defined by L, transmitted since the previous occurrence of an interrupt and for extracting L new samples from the receive buffer, and means for exercising the receiver using the L new samples and for exercising the transmitter and generating L new samples.

There is also provided in accordance with the present invention a host computer based communication system for coupling the host computer to a communication line, the system executing on an interrupt basis within the host computer every L1 sample times, the system comprising a transmitter coupled to a data source for generating symbols therefrom to be transmitted, a transmit sample buffer having a length L2 for buffering data generated by the transmitter, digital to analog means for converting digital symbol data generated by the transmitter into analog form for transmission over the communication line, analog to digital means for converting analog symbol data received over the communication line into digital form, a receive sample buffer having a length L2 for buffering data generated by the analog to digital means, a receiver for generating digital data from digital symbol data received from the receiver, means for determining the number of transmit samples, defined by L, transmitted since the previous occurrence of an interrupt and for extracting L new samples from the receive buffer, means for exercising the receiver using the L new samples, means for determining the number of transmit samples, defined by L3, transmitted from the previous occurrence of an interrupt until the end of the current processing associated with the current interrupt, means for exercising the transmitter to generate L new samples and dummy samples in accordance with L and L3, means for overwriting dummy samples previously stored in the transmit buffer that were not yet transmitted with the L new samples and the dummy samples, and means for transmitting the L new samples and for transmitting the dummy samples in the event the next interrupt is delayed.

BRIEF DESCRIPTION OF THE DRAWINGS

The invention is herein described, by way of example only, with reference to the accompanying drawings, wherein.

DETAILED DESCRIPTION OF THE INVENTION

As used throughout this document, the term latency is defined as the waiting time between the occurrence of an interrupt and the actual start of execution of the interrupt routine. The term delay is defined as the time period from one point in time to another and is usually determined by the hardware and/or software of the system.

To better illustrate the operation and utility of the dynamic buffer system of the present invention, the system is described in the framework of a full duplex voiceband modem. However, it is understood that the example presented throughout this disclosure in no way limits the scope of the present invention. One skilled in the art may take the principles of the system and methods of the present invention disclosed herein and apply them to many other types of full duplex communication systems, those of which that are well known in the art.

Note that there are two major types of delay associated with NSP modems. The first is the modem delay itself, meaning the time to process the samples plus the time the sample spends going through the receive buffer and the transmit buffer. In other words, the modem delay is the time measured from when a sample is transmitted by the other side to when a response arrives back to the other side. The second type of delay is the interrupt latency which is dependent upon the computer and operating system implementation and upon the number and complexity of the tasks the CPU is running at any point in time. The two types of delay are independent of each other.

Figure 1:
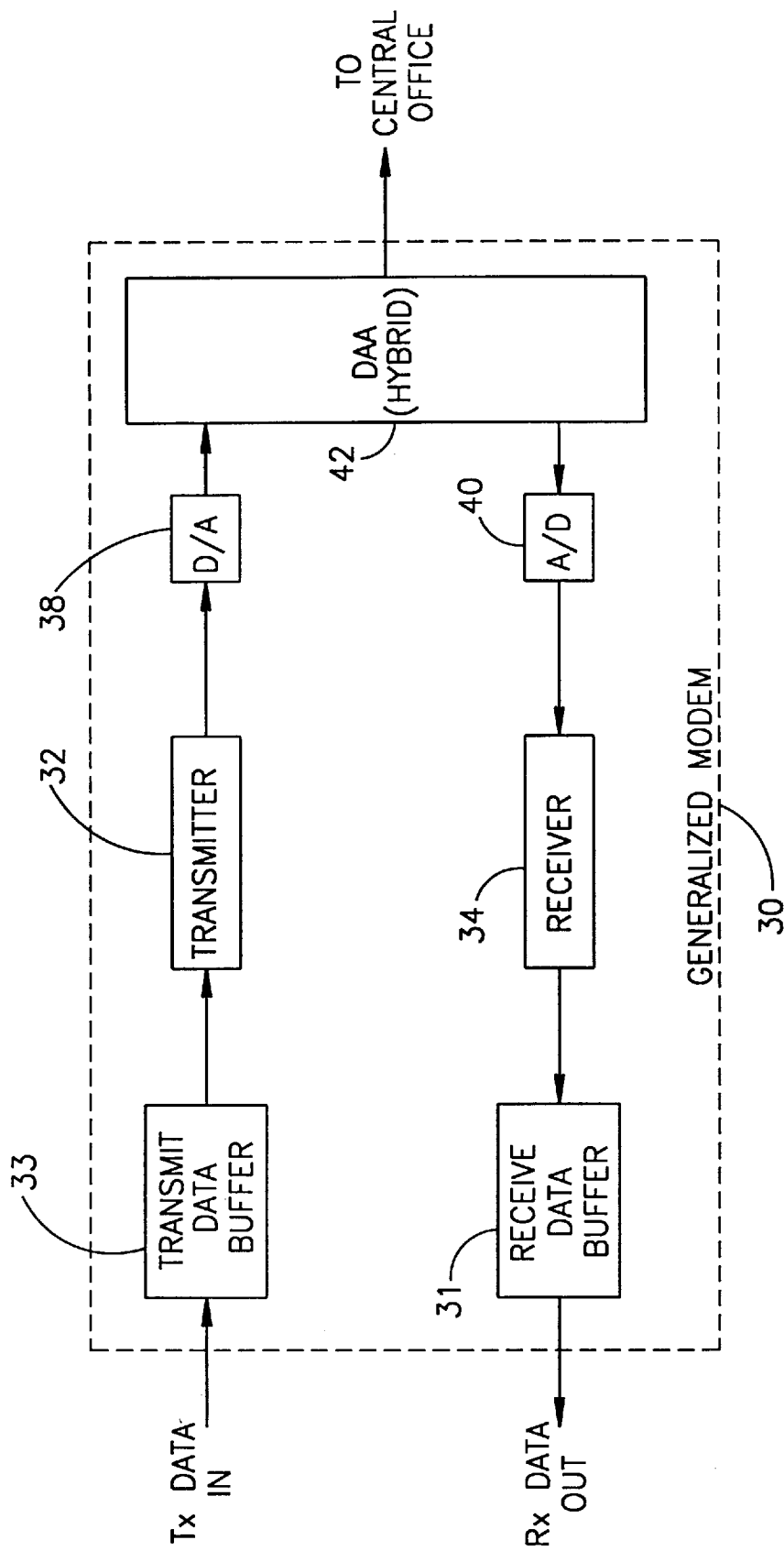
FIG. 1 is a high level functional block diagram illustrating a functional view of a modem utilized in the communication system of the present invention.

A high level functional block diagram illustrating a general realization of a full duplex voiceband modem 30 utilized in the communication system of the present invention is shown in FIG. 1. Modem 30 contains a transmit data buffer 33, a transmitter 32, a receive data buffer 31, a receiver 34, a digital to analog (D/A) converter 38, an analog to digital (A/D) converter 40 and a digital access arrangement (DAA) or hybrid 42. The data buffer 33 receives data to be transmitted from the Tx data in port and outputs data to transmitter 32. The transmitter 32 outputs transmit Tx samples to D/A 38. DAA 42 functions to match the impedances between the telephone line and the transmitter and receiver. It transforms balanced analog voltage on the two-wire pair from the central office (CO) to two two-wire unbalanced pairs, one for the transmitter and one for the receiver. Receiver 34 outputs a digital receive data to receive data buffer 31. The data buffer 31 in turn outputs an Rx data out signal.

Figure 2:
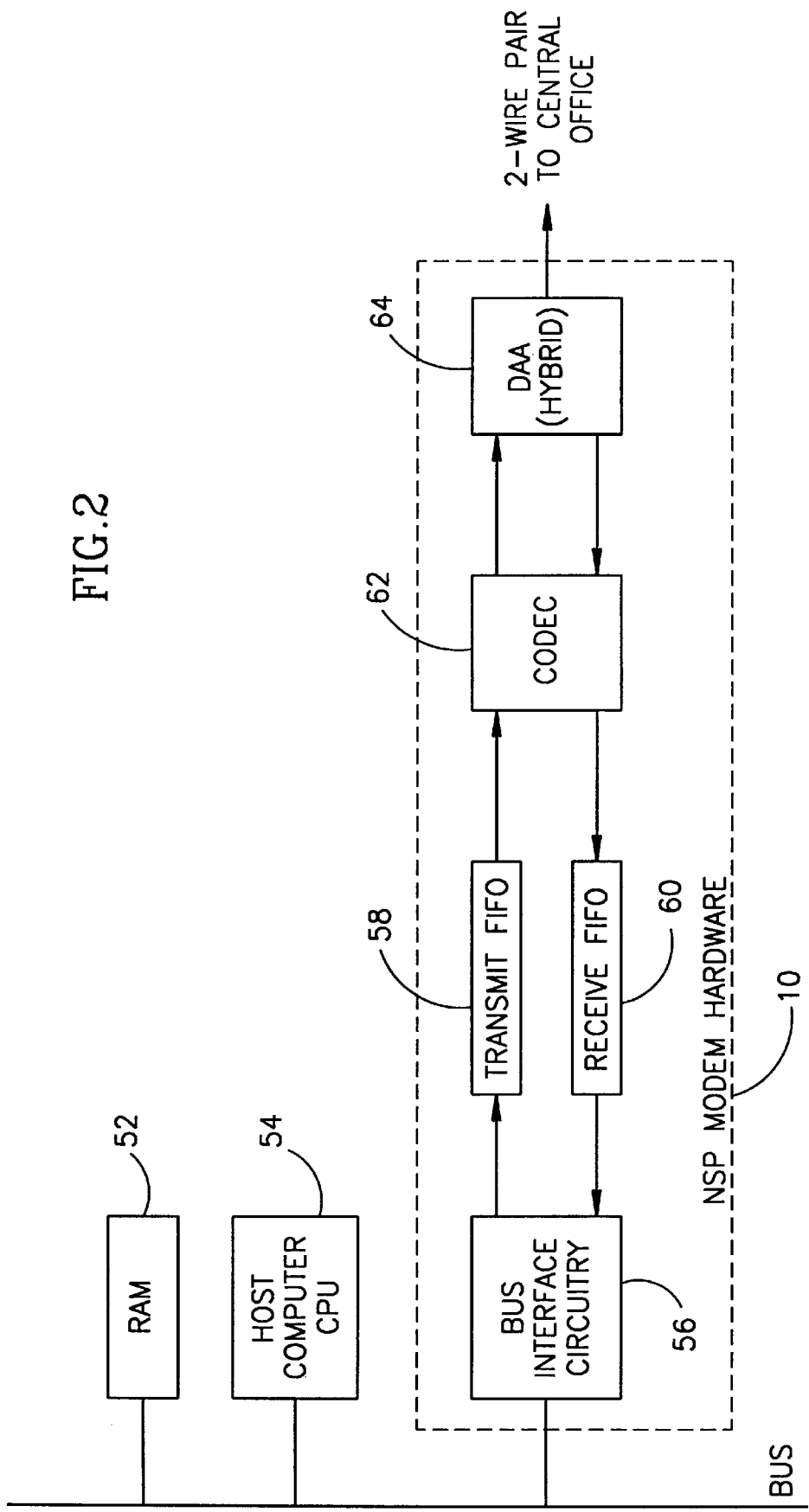
FIG. 2 is a high level block diagram illustrating the native signal processing (NSP) modem of the present invention coupled to a host computer.

A high level block diagram illustrating the native signal processing (NSP) modem, generally referenced 10, coupled to a host computer is shown in FIG. 2. NSP modem 10 generally comprises a hardware portion and a software portion. The software portion runs on host computer CPU 54. FIG. 2 illustrates an implementation of a full duplex voiceband modem where, the signal processing tasks shown in FIG. 1, i.e., transmitter 32 and receiver 34, are performed using a host computer central processing unit (CPU) 54. The host computer also includes random access memory (RAM) 52 for use by the operating system of the host computer and its tasks. During execution of the NSP modem, portions of the software used to run the modem are resident at varying times within RAM 52.

A DAA 64 forms the physical line interface to the 2-wire pair from the CO (e.g., RJ-11, RJ-45 or any other suitable connection method). The host CPU 54 commuunicates to NSP modem 10 through bus interface circuitry 56. Two first in first out (FIFO) buffers are used to buffer samples to and from the host computer CPU. A transmit FIFO 58 buffers outbound samples and a receive FIFO 60 buffers inbound samples. A coder/decoder (CODEC) 62 couples a transmit FIFO 58 and receive FIFO 60 to DAA 64. CODEC 62 performs the D/A and A/D functions of D/A 38 and A/D 40 (FIG. 1).

First Dynamic Buffer Size Method

In the first dynamic buffer size method, both the receive and transmit buffers have the same non-fixed length denoted by L. The communication system interrupts the CPU after L1 samples are received and transmitted. The number L1 refers to both the number of samples received and the amount of buffer space used by the samples. Thus, L1 is the minimum size for both the transmit and receive buffers. At some point during the communication connection, the transmitter generates a long sample sequence of size L2, which is the maximum size for the buffer. Whenever the modem routine is exercised, it checks the number of samples received in the buffer, i.e., L samples, processes the samples and generates an equal number of samples to be transmitted. Note that in order to avoid overrun, it is important that sufficient memory for the receive buffer be allocated so as to hold at least L2 samples. Since the modem routine is exercised (i.e., activated) after at least L1 samples have been received, the variable length L must be greater than or equal to L1.

$L \geq L1$ However, as long as L is less than L2 (leaving enough time for processing), there are a sufficient number of samples to be transmitted.

In practice, during the communication system steady state, the modem routine is exercised every L1 samples, thus guaranteeing short processing times. However, when the CPU is busy processing other tasks, the execution of the modem routine is delayed. The delay, taking into account processing time, can reach up to the time equivalent of L2 samples. The modem routine is exercised as soon as the CPU becomes available with the minimal delay possible. As a result of the delay, the number of samples to be processed and the corresponding processing time increases proportionally.

The size of the processed buffers for the receiver and transmitter (i.e., the number of samples in the receive and transmit buffers) changes coherently at each call to the modem routine and remains as close as possible to the minimum permitted sizes. Note that the size of the buffers change dynamically without any external triggers and without any data distortion or loss.

Figure 3:
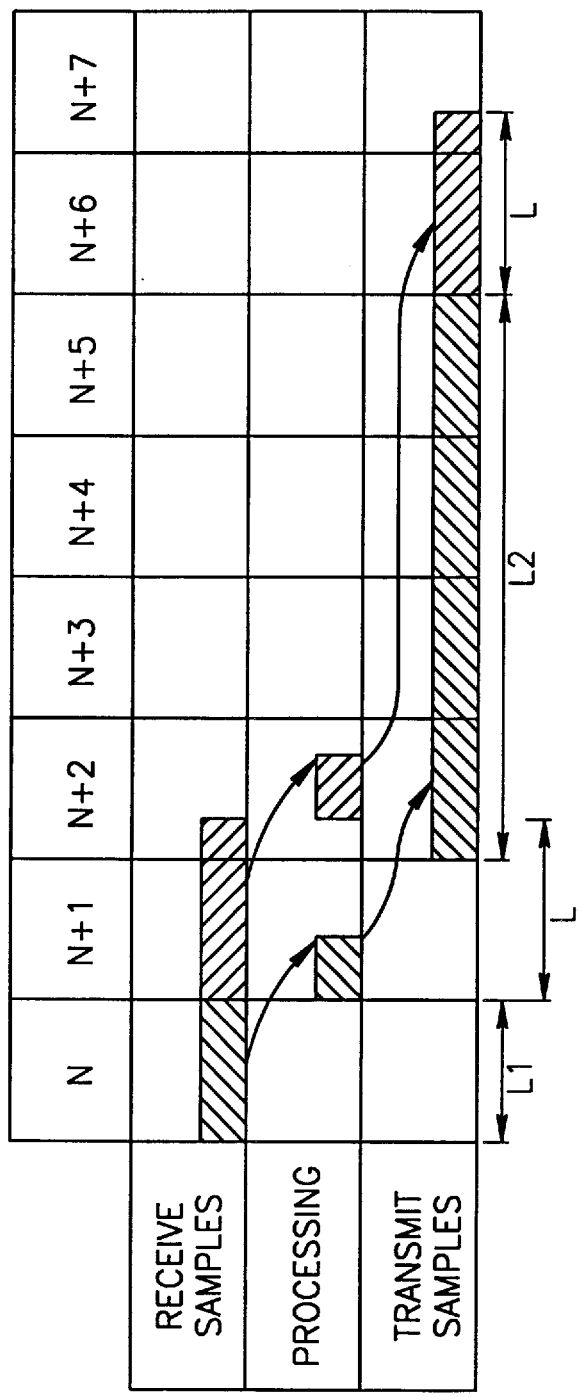
FIG. 3 illustrates the steps of receiving, processing and transmitting in relation to the sequencing of time slices for the first dynamic buffer size method of the present invention.

FIG. 3 illustrates the steps of receiving, processing and transmitting samples in relation to the sequencing of time slices. Each column, located between two vertical lines represents one time slice. The vertical lines represent hardware interrupts that occur once at the start of each time slice or sample time. Normally, for each time slice the communication process running within NSP modem 10 is executed. During this time, the samples that were collected during the previous time slice are processed and samples are generated that are to be transmitted during the next time slice. Thus, samples that are collected during time slice N are processed during time slice N+1. Also, during time slice N+1, samples are generated which will be transmitted during time slice N+2.

The operation of the first dynamic buffer size method will now be described with reference to FIG. 3. Assume time slice N is the current slice and a buffer of samples of length L1 is received during this slice. During time slice N+1, the samples received during slice N are processed. However, during processing, the modem routine generates a buffer having a long sequence of samples of length L2. The long sequence begins to be transmitted by the transmitter portion during slice N+2. During slice N+1, another L samples are received by the receiver portion. These samples are normally processed at some point during the next time slice N+2. However, the CPU experiences very high loading and the modem routine cannot be called for a few time slices. During this time when the CPU is busy, the samples of the long sequence generated during time slice N+1 are transmitted. As shown in FIG. 3, up to L2 samples, while taking into account processing time, can be transmitted before the modem routine must generate additional samples. The transmission of the L samples generated during time slice N+2 is delayed until time slice N+6.

Figure 4:
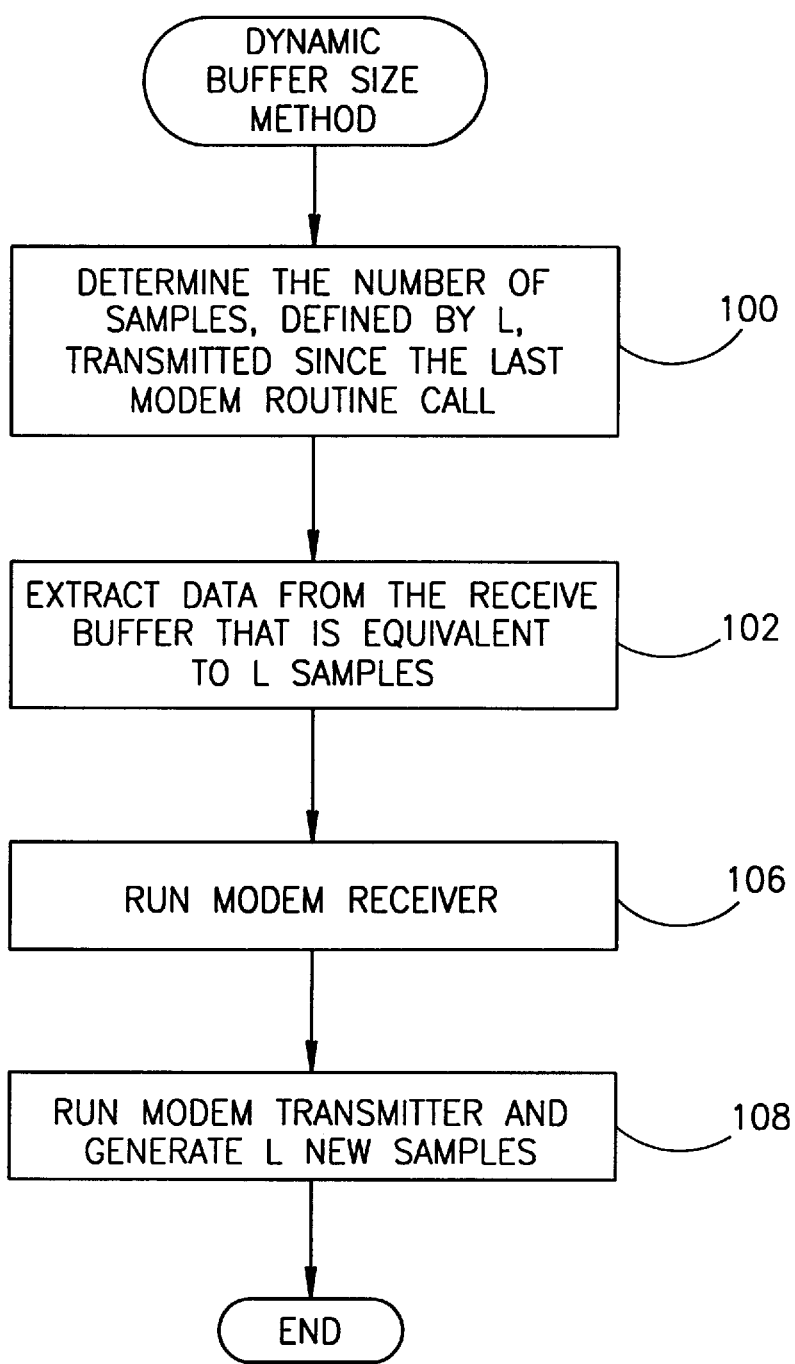
FIG. 4 is a high level flow diagram illustrating a first method of dynamically varying the size of the buffers used in the communication system of the present invention.

A high level flow diagram illustrating a first method of dynamically varying the size of the buffers used in the communication system of the present invention is shown in FIG. 4. First, the number of samples, referred to as L, transmitted since the last time the modem routine was called is determined (step 100). The number of samples transmitted is determined by checking the transmit FIFO. This gives a measure of the time since the last time the interrupt routine was called. In the steady state, L (the number of samples transmitted between successive calls to the interrupt routine) is equal to L1. An amount of data equivalent to L samples is then extracted from the buffer (step 102). The modem receiver portion of the modem routine is then executed (step 106). Finally, the transmitter portion of the modem routine is executed and L new samples are generated (step 108).

As can be seen in FIG. 3, the delay introduced by the method disclosed above is L1+L2 because data sent from the other side's transmitter is first buffered until at least L1 samples are collected. These samples are then processed and a response is generated. The response then works its way through the transmit buffer of length L2.

The point in time when the long sequence of samples is generated depends on the modem type. In high bit rate modems (e.g., V.32 bis, V.34, etc.), the long sequence of samples is generated at the end of the so called ranging period since during this period, very short and accurate response times are required. In other types of modems, the long sequence can be generated at the beginning of the modem operation or any other time during the operation of the modem.

It is important to note the tradeoff between making the value of L2 either short or long. If L2 is made shorter, the interrupt latency resistance (i.e., resistance to longer CPU latency times) decreases. However, the sample delay is shorter. The sample delay is the time a sample must wait before it leaves the buffer. Shorter buffers offer less sample delay. On the other hand, longer buffers offer greater interrupt latency resistance. However, longer buffers also increase sample delay because it now takes longer before a sample is read out of the buffer.

In absolute terms, it is recommended that the equivalent time length of L1, the minimum buffer size, not be less than 8 ms, otherwise interrupts are generated too often. At the other extreme, L2 should not be more than 64 ms, otherwise the sample delay is intolerable. In a preferred embodiment, L2 lies in the range of 16 to 48 ms. If the length of L2 is set equal to 2*L1 then exactly one interrupt can be missed and no overruns or underruns will be generated. Likewise if the length of L2 is set to 3*L1 then two interrupts can be missed without generating an overrun or underrun condition (assuming sufficient time is left for processing).

Second Dynamic Buffer Size Method

The present invention also teaches a second dynamic buffer size method which functions to further reduce the buffer delay of the communications systems while in the steady state and while preserving the immunity to interrupt latency obtained by the first dynamic buffer size method. The modem routine execution method remains essentially the same as in the first dynamic buffer size method. In particular, the modem routine is exercised when L samples are received. Thus, the minimum value for L is L1 received samples. However, the modem generates L2 samples for transmission. The samples generated for transmission are divided into two sequences. The first L samples are samples generated from actual real data, the remainder of the samples are 'dummy' samples and are generated using dummy data described below. To simplify the implementation of the communication system, in a preferred embodiment, the number of processed samples L is an integer multiple of the number of samples per symbol.

Each time the transmit buffer is filled with generated data samples, the dummy samples that remain untransmitted from the previous buffer are overwritten. Thus, only the L1 portion of the sample buffer is cycled through unless the interrupt latency increases and the dummy filled portion of the sample buffer must be used. This method guarantees that as long as the modem routine is called on time after L1 samples have been received and L1 samples have been transmitted, the dummy samples will not be transmitted. In this case, the buffer delay period is 2*L1 sample times. However, during CPU load peaks, some or all of the dummy samples will be transmitted causing a temporary delay or in some cases a modem retraining sequence.

In order to maintain the connection, the samples that are generated for transmission should be coherent with the samples that were already transmitted whether only real samples or real and dummy samples were transmitted. In order for the transmitter to achieve this, it must preserve its internal state and generate the next set of samples starting from the state stored in connection with the set of samples last transmitted. This implies that the transmitter must preserve at least two states: the first at the end of the set of real data samples and the second at the end of the set of dummy samples. In this case, if only a partial number of the dummy samples were transmitted then all the dummy samples must be transmitted, i.e., all or nothing. Optionally, the transmitter can be constructed to handle the case when one half, one quarter, one eighth, etc. of the dummy samples were transmitted by preserving additional states.

The maximal number of samples that can be overwritten is equal to the total number of samples in the transmit buffer when an interrupt is generated, i.e., L2, minus the number of samples, denoted by L3, that were transmitted at the time the service routine ended and more samples are generated. The value L3 is estimated before the activation of the transmitter based on the known worst case performance of the transmitter routine.

Note that it is preferable to overwrite samples on a symbol resolution. Thus, even if one sample of a symbol has been transmitted, the samples are overwritten starting from the first sample of the next symbol. In this case, the maximum number of non transmitted samples is overwritten while still maintaining signal coherence. It is appreciated that if the dummy samples are actually silence (or DC without any signal), there is no coherency problem in the first place.

Figure 5:
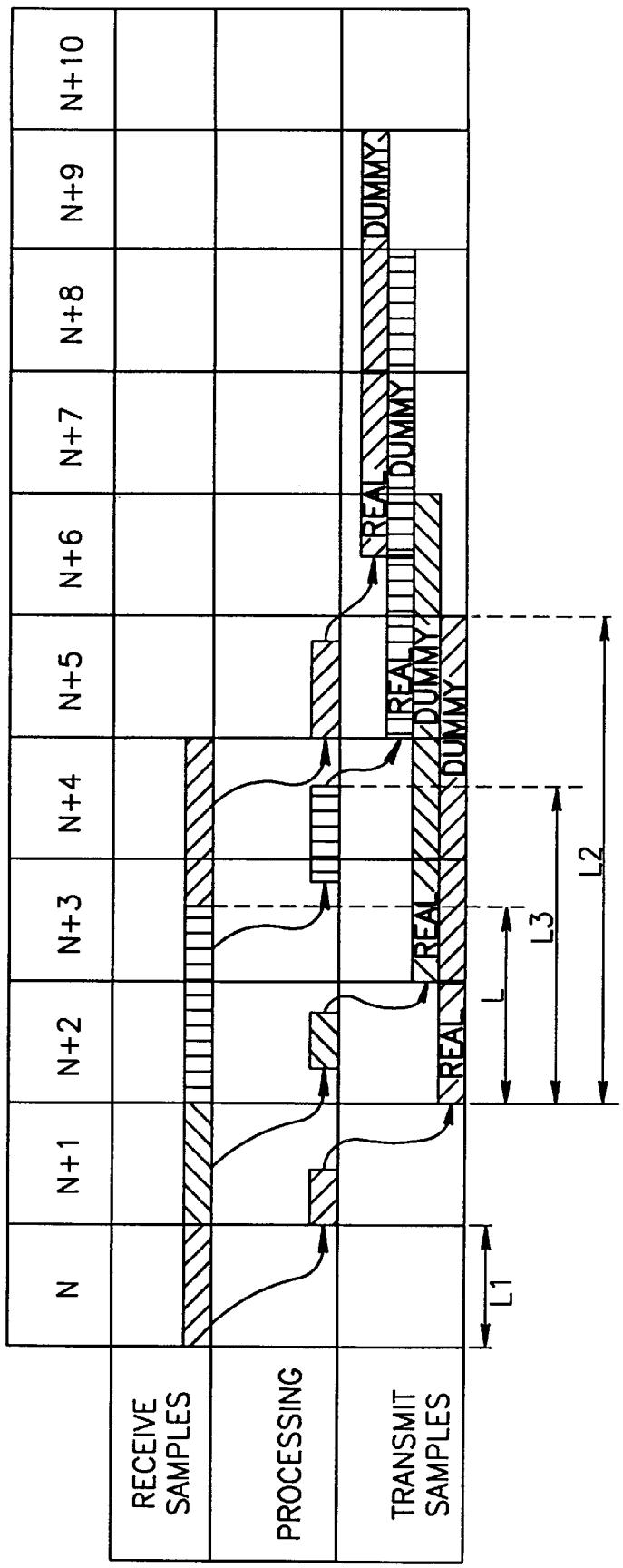
FIG. 5 illustrates the steps of receiving, processing and transmitting in relation to the sequencing of time slices for the second dynamic buffer size method of the present invention.

The operation of the second dynamic buffer size method will now be described with reference to FIG. 5. FIG. 5 illustrates the steps of receiving, processing and transmitting samples in relation to the sequencing of time slices. Each column, located between two vertical lines represents one time slice. The vertical lines represent hardware interrupts that occur once at the start of each time slice or sample time. Normally, for each time slice, the communication process running within NSP modem 10 is executed. During this time, the samples that were collected during the previous time slice are processed and samples are generated that are to be transmitted during the next time slice. Thus, samples that are collected during time slice N are processed during time slice N+1. Also, during time slice N+1, samples are generated which will be transmitted during time slice N+2.

For the sake of example it is assumed that processing time is limited to 50% of the total CPU time and that the transmitter routine preserves its state after generating real samples and for every L1 sample boundary. In the example of FIG. 5, L2 is four times L1, thus the transmitter preserves up to four states, each state associated with a time slice. During time slice N+1, the samples received during time slice N are processed. During processing, the modem routine generates a buffer having a long sequence of samples having length L2. From these L2 samples, L1 are real samples and the remainder are dummy samples.

Similarly, the samples received in slice N+1 are processed during time slice N+2. Although the processing of these samples is delayed due to interrupt latency, the processing is completed before the end of the time slice, i.e., L3<L1. In addition, the dummy samples generated during time slice N+1, which were not transmitted, are overwritten. The subsequent processing time is delayed even further with the next processing time beginning within time slice N+3 and ending within time slice N+4(L3>L1). In this case, some of the dummy samples are transmitted due to interrupt latency. Thus, the transmitter routine, in this case, generates a sequence of L real samples starting from the state stored at the end of the first 2*L1 samples that were generated during time slice N+2. The transmitter routine then generates L2-L dummy samples following the real samples. The last 2*L1 samples residing in the transmit buffer are overwritten with the new samples. The samples received during the latter part of time slice N+3 and during time slice N+4 are processed during time slice N+5. During the processing in time slice N+5, the dummy samples previously written to the transmit buffer are overwritten.

Note that in this case, the number of dummy samples generated is smaller than L2-L because there were more than L1 real samples generated during the previous processing cycle, some of which are still in the transmit buffer waiting to be transmitted.

Figure 6:
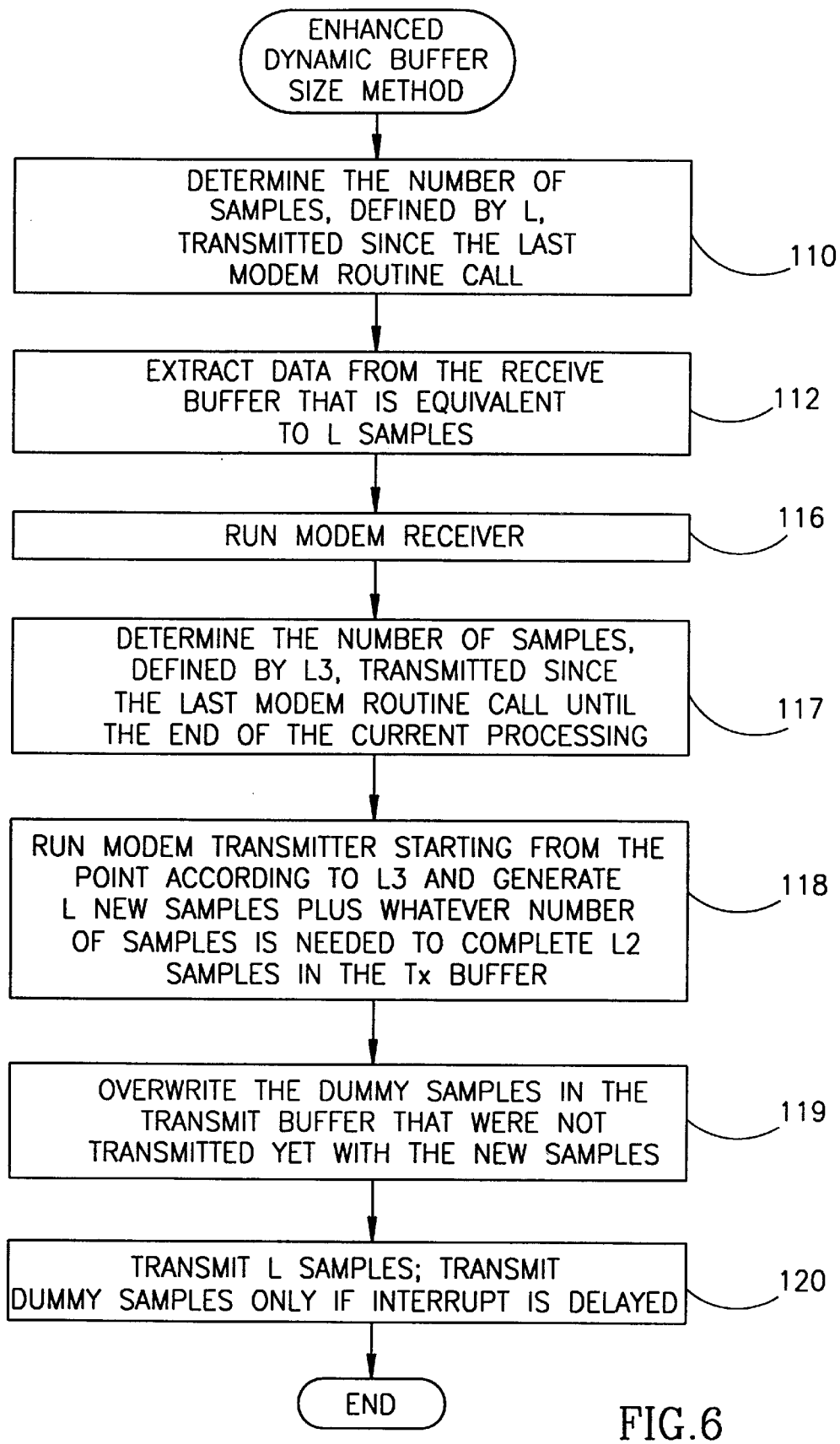
FIG. 6 is a high level flow diagram illustrating a second method of dynamically varying the size of the buffers used in the communication system of the present invention.

A high level flow diagram illustrating a second method of dynamically varying the size of the buffers used in the communication system of the present invention is shown in FIG. 6. First, the number of samples, referred to as L, transmitted since the last time the modem routine was called is determined (step 110). The number of samples transmitted is determined by checking the transmit FIFO. This gives a measure of the time since the last time the interrupt routine was called. In the steady state, L (the number of samples transmitted between successive calls to the interrupt routine) is equal to L1. An amount of data equivalent to L samples is then extracted from the receive buffer (step 112). The modem receiver portion of the modem routine is then executed (step 116). Next, the number of samples, referred to as L3, to be transmitted since the last time the modem transmitter routine was called up to the end of the current processing cycle is determined (step 117). This number, L3, is determined by checking the current level of transmit FIFO and adding to it the estimated processing time for the transmitter routine to process the current transmit FIFO. Then the transmitter portion of the modem routine is executed and L new real samples are generated. The transmitter routine recalls the state it had previously preserved at the time the last sample within the most recent L3 buffer was transmitted. In addition, the remainder of the buffer is loaded with enough dummy samples to completely fill the buffer which is of size L2 (step 118). The dummy samples already present in the transmit buffer that were not transmitted yet are overwritten with the new samples (step 119). Under steady state conditions, only L1 real samples are transmitted before the next interrupt is generated (step 120). In the event the CPU experiences higher loading, meaning that the interrupt latency is increased, some or all of the dummy samples that were previously stored in the sample buffer are transmitted. As explained above, these dummy samples function to keep the connection alive until the transmit routine can be serviced again.

The dummy data comprising the dummy samples used by the method of the present invention can be any data such that when transmitted, it will be treated by the data link protocol on the far end of the connection as corrupted data and will be handled accordingly. Whatever is sent, it is important that the modem on the other end of the connection does not perform a disconnect. Alternatively, rather than send dummy samples, silence can be transmitted instead. If an error correction protocol is in use (e.g., V.42 bis), the real data will not be affected except for a possible retransmission. Otherwise, data errors may be encountered, but at least modem connectivity is preserved (i.e., the modems do not hang up).

In order to minimize the effect of the transmitted dummy data, it is recommended to adjust the operation of the modem routine to conform to the data protocol currently in use. For example, if the V.14 standard protocol is in use, it is recommended to use '1's for the dummy bits. This is because '1's are defined as stop bits which are used for synchronization by the V.14 protocol. Thus, they will have no effect aside from causing some delay.

For some modems the dummy data can be silence or DC. If the period of silence is short enough, the receiving modem may freeze its circuits without any degradation in connection quality or may start a retrain sequence. This is preferable to having the modem on the other end disconnect from the line. In some protocols, however, silence may be interpreted as a disconnect.

Transmitting silence has the advantage of simplicity in terms of generation of samples since it avoids the need for coherence when generating subsequent samples. In addition, it can be implemented using a fixed buffer of dummy samples or by simply retransmitting the last sample.

While the invention has been described with respect to a limited number of embodiments, it will be appreciated that many variations, modifications and other applications of the invention may be made.

What is claimed is:

1. In a communication system having a computer, a software modem transmitter portion, a transmit sample buffer having a length L2, a software modem receiver portion, and a receive sample buffer having a length L2, an interrupt to the computer is generated after receiving every L1 samples by the receiver, said computer executing a receiver program module and a transmitter program module to perform the communication, said computer may ignore a plurality of successively generated interrupts before responding to the latest generated interrupt, a method for dynamically changing the length of said transmit sample buffer and said receive sample buffer, said method comprising the steps of:

determining the number of transmit samples, defined by L, transmitted from the transmit sample buffer since the previous responding to the interrupt by the computer, said number of transmit samples is determined from the number of samples remaining in said transmit sample buffer from a previous time slice;

extracting L new samples from said receive sample buffer;

exercising said software modem receiver portion using said L new samples;

exercising said software modem transmitter portion to generate said L new samples; and storing said generated L new samples into said transmit sample buffer.

2. In a communication system having a software modem transmitter portion, a transmit sample buffer having a length L2, a software modem receiver portion and a receive sample buffer having a length L2, an interrupt to a computer of the system is generated after receiving every L1 samples by the receiver, said computer executing a receiver program module and a transmitter program module to perform the communication, said computer may ignore a plurality of successively generated interrupts before responding to the latest generated interrupt a method for dynamically changing the length of said sample buffers, said method comprising the steps of:

determining the number of transmit samples, defined by L, transmitted since the previous responding to the interrupt, said number of transmit samples determined from the number of samples remaining in said transmit sample buffer from the previous time slice;

extracting L new samples from said receive buffer;

exercising said software modem receiver portion using said L new samples;

determining the number of transmit samples, defined by L3, transmitted from the previous occurrence of an interrupt until the end of the current processing associated with the current interrupt;

exercising said software modem transmitter portion to generate L new samples and dummy samples in accordance with L and L3;

overwriting dummy samples previously stored in said transmit buffer that were not yet transmitted with said L new samples and said dummy samples;

transmitting said L new samples via said software modem transmitter portion; and transmitting said dummy samples via said software modem transmitter portion in the event the next interrupt is delayed.

3. The method according to claim 2, further comprising the step of maintaining at least one intermediate state of said transmitter between processing cycles.

4. The method according to claim 2, wherein said dummy samples generated during said step of exercising said transmitter corresponding to silence.

5. A host computer based communication system for coupling a host computer to a communication line, an interrupt to said host computer of the system is generated after receiving every L1 samples, said computer may ignore a plurality of successively generated interrupts before responding to the latest generated interrupt said system comprising:

a software modem transmitter portion coupled to a data source and adapted to generate symbols therefrom to be transmitted;

a transmit sample buffer having a length L2 for buffering data generated by said software modem transmitter portion;

digital to analog means for converting digital symbol data generated by said software modem transmitter portion and stored in said transmit sample buffer into analog form for transmission over said communication line;

analog to digital means for converting analog symbol data received over said communication line into digital form;

a receive sample buffer having a length L2 for buffering data generated by said analog to digital means;

a software modem receiver portion adapted to generate digital data from digital symbol data stored in said receive sample buffer;

means for determining the number of transmit samples, defined by L, transmitted since the previous responding to the interrupt and for extracting L new samples from said receive buffer; and means for exercising said software modem receiver portion using said L new samples and for exercising said software modem transmitter portion and generating L new samples.

6. A host computer based communication system for coupling a host computer to a communication line, an interrupt to said host computer of the system is generated after receiving every L1 samples, said computer may ignore a plurality of successively generated interrupts before responding to the latest generated interrupt said system comprising:

a software modem transmitter portion coupled to a data source and adapted to generate symbols therefrom to be transmitted;

a transmit sample buffer having a length L2 for buffering data generated by said software modem transmitter portion;

digital to analog means for converting digital symbol data generated by said software modem transmitter portion and stored in said transmit sample buffer into analog form for transmission over said communication line;

analog to digital means for converting analog symbol data received over said communication line into digital form;

a receive sample buffer having a length L2 for buffering data generated by said analog to digital means;

a software modem receiver portion adapted to generate digital data from digital symbol data stored in said receive sample buffer;

means for determining the number of transmit samples, defined by L, transmitted since the previous responding to the interrupt and for extracting L new samples from said receive buffer;

means for exercising said software modem receiver portion using said L new samples;

means for determining the number of transmit samples, defined by L3, transmitted during the time period defined from the previous responding to the interrupt until the completion of the processing associated with the current interrupt;

means for exercising said software modem transmitter portion to generate L new samples and dummy samples in accordance with L and L3;

means for overwriting dummy samples previously stored in said transmit buffer that were not yet transmitted with said L new samples and said dummy samples; and means for transmitting said L new samples and for transmitting said dummy samples in the event the next interrupt is delayed.

7. The method according to claim 6, further comprising the step of maintaining at least one intermediate state of said transmitter between processing cycles.

8. The method according to claim 6, wherein said dummy samples generated during said step of exercising said transmitter corresponding to silence.

* * * * *